(12) United States Patent
Volkmer et al.

(10) Patent No.: US 8,715,493 B2
(45) Date of Patent: May 6, 2014

(54) FILTER ARRANGEMENT FOR FILTERING LIQUIDS

(75) Inventors: Daniel Volkmer, Hemmingen (DE); Norbert Straβenberger, Adlkofen (DE)

(73) Assignee: Mann + Hummel GmbH, Ludwigsburg (DE)

( * ) Notice: Subject to any disclaimer, the term of this patent is extended or adjusted under 35 U.S.C. 154(b) by 531 days.

(21) Appl. No.: 13/090,448

(22) Filed: Apr. 20, 2011

(65) Prior Publication Data

US 2011/0253608 A1 Oct. 20, 2011

(30) Foreign Application Priority Data

Apr. 20, 2010 (DE) .......................... 10 2010 015 837

(51) Int. Cl.
*B01D 35/147* (2006.01)
*B01D 29/58* (2006.01)

(52) U.S. Cl.
CPC .............. *B01D 29/58* (2013.01); *B01D 35/147* (2013.01)
USPC .......................................... 210/131; 210/132

(58) Field of Classification Search
USPC ................................................ 210/131, 132
See application file for complete search history.

(56) References Cited

U.S. PATENT DOCUMENTS

| 2,220,706 | A | * | 11/1940 | Cantin | .......................... | 210/132 |
| 3,473,663 | A | * | 10/1969 | Winslow | ........................ | 210/120 |
| 2005/0029171 | A1 | | 2/2005 | Evanovich et al. | | |

FOREIGN PATENT DOCUMENTS

DE 69509514 10/1999

OTHER PUBLICATIONS

DPMA Office Action on Germany priority application 10 2010 015 837.2-27, Sep. 2010.

* cited by examiner

*Primary Examiner* — Terry Cecil
(74) *Attorney, Agent, or Firm* — James Hasselbeck

(57) ABSTRACT

A filter arrangement for filtering liquids has a central tube and a first filter element flowed through in radial direction outwardly and disposed on the central tube. A downstream second filter element is disposed on the central tube and flowed through in radial direction inwardly. The first filter element is moveable along the central tube from a basic position into an extended position. In the basic position a connection between the inlet line and a clean side of the first filter element is provided by the first filter element. In the extended position a bypass between an inlet line and the clean side of the first filter element is provided to bypass the first filter element. A spring element, applying a restoring force in a direction of extension of the central tube, is arranged on the first filter element at a side facing away from the second filter element.

12 Claims, 3 Drawing Sheets

FILTER ARRANGEMENT FOR FILTERING LIQUIDS

CROSS REFERENCE TO RELATED APPLICATIONS

This application claims the benefit under 35 USC 119 of foreign application DE 10 2010 015 837.2 filed in Germany on Apr. 20, 2010, and which is hereby incorporated by reference in its entirety.

TECHNICAL FIELD

The invention relates to a filter arrangement for filtering liquids, in particular oils, fuels or the like.

BACKGROUND OF THE INVENTION

In the field of filtering technology there is the risk that contaminants in the liquid to be filtered deposit onto the filter elements and clog them. This can cause overpressure at the raw side of the filter which may cause damage and possibly even destruction of the filter element.

Filter arrangements are known that have overpressure valves and in this way prevent excessive pressure that could lead to the filter becoming damaged. The overpressure valves are in general expensive and must be integrated into the filter arrangement as an additional component.

SUMMARY OF THE INVENTION

It is therefore an object of the present invention to provide a filter arrangement with which it can be prevented in a constructively simple and inexpensive way that a clogged filter can become damaged.

In accordance with the present invention, this is achieved by a filter arrangement comprising a first filter element and preferably a second filter element wherein the first filter element is arranged to be extendable (moveable or slidable) along a central tube and can be transferred from a basic position into an extended position, wherein in the basic position a connection between an inlet line for the liquid and a clean side of the first filter element is realized through the first filter element, and wherein in the extended position the connection between the inlet line and the clean side of the first filter element is realized by a bypass for bypassing the first filter element. The movable arrangement of the first filter element is in particular advantageous because it provides a constructively simple possibility to move or transfer the first filter element from a basic position into an extended position. Since in the extended position a bypass for bypassing the first filter element is provided, the filter element when clogged cannot become damaged. When a second filter element is provided that is arranged downstream of the first filter element, the liquid to be filtered can still be filtered by the second filter element so that the liquid does not leave the filter arrangement in an unfiltered state.

In one embodiment, the first filter element is transferable from the basic position into the extended position by means of a pressure increase at the raw (unfiltered) side. Clogging of the first filter element effects immediately a pressure increase of the liquid pressure at the raw side of the first filter element or generates a higher differential pressure relative to the clean side of the filter element. When this pressure or differential pressure is greater than a predetermined reference pressure, the filter element is clogged and this clogging is so massive that the filter element could become damaged. Upon surpassing the reference pressure, the increased liquid pressure leads to a resulting force in the direction of extension or length of the central tube that is so great that the first filter element is lifted and the bypass is opened (released) in this way. The use of pressure increase at the raw side provides thus a constructively simple and reliable possibility in order to move the first filter element into the extended position and prevent damage. It is understood that after relief of a pressure that has been too great through the bypass, the pressure at the raw side can drop again to a value below the reference pressure so that the first filter element can be returned into its basic position and possibly, at least partially, can serve again for filtering the liquid.

In a further embodiment, the central tube is of a stepped configuration. This is advantageous because inlet and outlet lines can be provided for the liquid to be filtered within a wide section of the central tube. On the partial section (narrow section) of the central tube that has a reduced diameter relative to the wide section, the slidable first filter element can be guided.

In a further embodiment, in the basic position between a step or shoulder of the central tube and the first filter element a chamber for pressure build-up is formed. Since the increased liquid pressure acts on the side of the filter element that is facing the wide section of the central tube, a force is exerted onto the first filter element that is oriented away from the wide section of the central tube. In this connection, advantage is taken of the fact that the section of the chamber that is formed by the first filter element, in a projection transverse to the sliding direction, has a greater surface area than the section of the chamber that is formed on the central tube, inter alia because the inlet line opens here. In this way, when the first filter element is clogged, the liquid pressure that is too high can be utilized in order to transfer or move the first filter element from the basic position into the extended position.

In one embodiment, on the first filter element an end disk is provided that comprises in radial direction an inwardly positioned wall section that is curved away from the wide section of the stepped central tube (i.e., toward a further end disk). The magnitude of the force that is caused by a given increase of the liquid pressure and is acting on the first filter element in the sliding direction will result (in a direction along the central tube) depends on the total surface area and the curvature of the wall section.

In a further embodiment, the first filter element is movable against a restoring force from the basic position into the extended position. In this way, the magnitude of the force that is needed for transferring the first filter element from the basic position into the extended position is adjusted by the restoring force. Also, it is possible to adjust and optionally limit the extension travel. It is understood that the extended position does not determine a fixedly set spacing of the first filter element relative to the second filter element or relative to the wide section of the central tube but instead describes a range of spacings (different from zero) within which the first filter element can release or open the bypass.

In another embodiment, for applying the restoring force a spring element is provided that acts in the direction of extension (length) of the central tube and that is arranged preferably on a side of the first filter element that is facing away from the second filter element. A spring element is a constructively simple possibility to realize a restoring force. The spring element can be integrated in particular into a housing lid of the filter arrangement.

In one embodiment the bypass for bypassing the first filter element is sealed in the basic position by an axial sealing element. By pressing the first filter element against the axial sealing element by means of the spring element it can be effectively ensured that in the basic position no liquid to be filtered can bypass the first filter element.

In a further embodiment, the axial sealing element is embodied as a shaped seal. A shaped seal is an inexpensive sealing element whose shape is matched to the geometry of the filter elements.

In one embodiment, a radial sealing element is provided between the central tube and an end disk that is preferably positioned on the side of the first filter element facing away from the second filter element. In this way, it is ensured that at the side of the first filter element that is facing away from the second filter element or the wide section of the central tube no unfiltered liquid can escape.

In a further embodiment, the radial sealing element has a flexible sealing lip for a low-friction sealing action between the end disk and the central tube. A flexible sealing lip has the effect that during movement of the first filter element along the central tube additional friction forces that occur upon movement of the first filter element along the central tube are kept minimal and, therefore, the force expenditure for moving the radial sealing element can be reduced.

Further features and advantages of the invention result from the following description of embodiments of the invention, from the Figures of the drawing showing details relevant to the invention, and from the claims. The individual features may also be important, individually or in any combination with each other, for realizing variants of the invention.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1A:
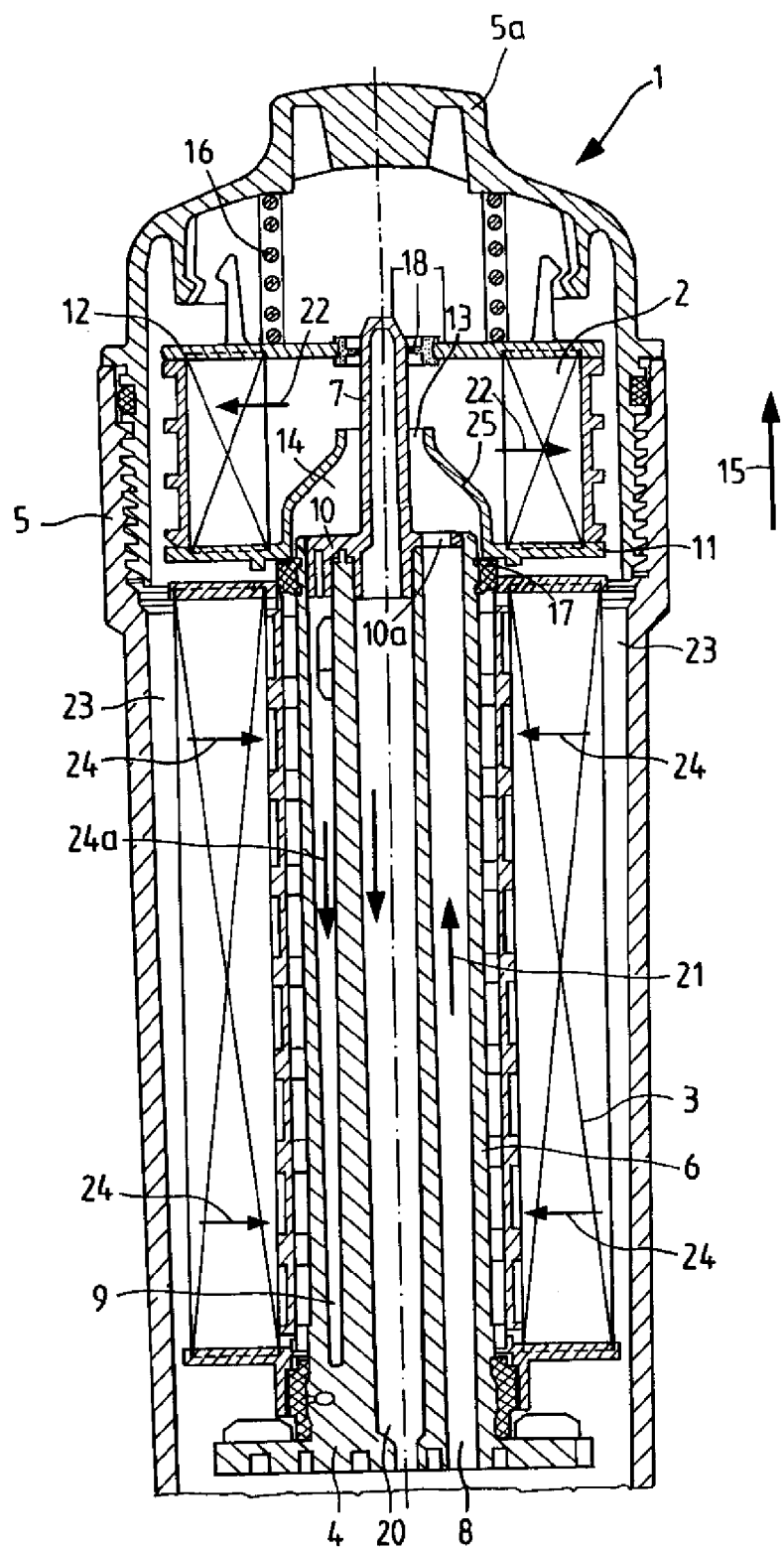
FIG. 1a shows a section illustration of the filter arrangement according to the present invention in a basic position of the first filter element.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to a filter arrangement for filtering liquids. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

FIG. 1a shows a filter arrangement 1 with a first filter element 2 and a second filter element 3 that are arranged along a central tube 4. The filter arrangement 1 comprises moreover a housing 5 in which the central tube 4 and the two filter elements 2, 3 are arranged.

The central tube 4 is of a stepped configuration and has a first lower section (wide section) 6 that has a greater diameter in comparison to a second upper section (narrow section) 7. Between the first section 6 and the second section 7 of the central tube 4 there is a step or shoulder 10.

In the lower section 6 of the central tube 4 an inlet line 8 and a discharge line 9 are provided through which the liquid to be filtered (for example, fuel or oil) is supplied to the filter arrangement 1 and is removed therefrom after purification. The inlet line 8 ends at opening 10a in the shoulder 10 where the lower section 6 passes into the upper section 7 of the central tube 4.

The first filter element 2 is arranged to be movable along the upper section 7 of the central tube 4 and is delimited by a lower end disk 11 and an upper end disk 12. The filter element 2 has a filter medium of a circular cylindrical shape that is connected, for example, by an adhesive, to the fluid-tight end disks 11, 12. While the upper end disk 12 is of a flat configuration across its entire radial extension, the lower end disk 11 has in radial direction an inwardly positioned wall section 25 that is curved away from the second filter element 3 in the direction of the upper end disk 12. Between the lower end disk 11 and the central tube 4 there is a gap 13. The lower end disk 11 forms together with the central tube 4 and the shoulder 10 of the central tube 4 a chamber 14 into which the liquid to be filtered can flow through inlet line 8 and can pass through gap 13 into the first filter element 2.

In FIG. 1a the first filter element 2 is in a basic position. Starting from this basic position, the first filter element 2 can be moved along the central tube 4 as indicated by arrow 15. This movement of the first filter element 2 is opposite to a restoring force that is provided by a spring element 16 embodied as a coil spring and mounted on a lid 5a of the housing 5. The spring element 16 is supported with one end on the housing lid 5a and with the other end on the upper end disk 12.

In order to provide pressure compensation between the air volume that is enclosed between the upper end disk 12 and the housing lid 5a and that is reduced upon movement of the first filter element 2 from the basic position into the extended position, a venting line 20 is provided at the center of the central tube 4. This venting line 20 effects a pressure compensation between the described air volume and the ambient pressure.

On the shoulder or step 10 an axial sealing element 17 is provided which is embodied as a shaped seal and effects a sealing action between the lower end disk 11 and the central tube 4 and seals the chamber 14 relative to the clean side of the first filter element 2. This sealing action between the upper end disk 12 and the central tube 4 is ensured by a radial sealing element 18 that is flexible and is of a special low-friction embodiment as will be explained in more detail in the following with the aid of FIG. 2 which illustrates a detail view of the radial sealing element 18.

Figure 2:
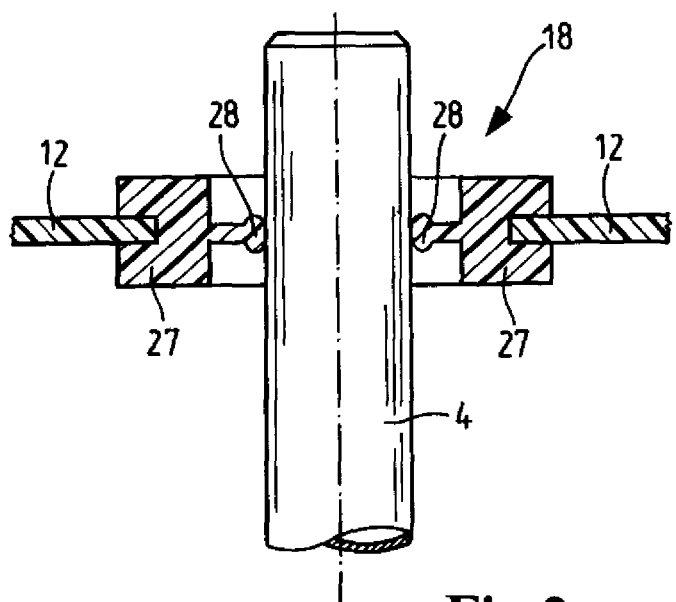
FIG. 2 shows a detail of a radial seal in a section illustration.

The radial sealing element 18 illustrated in FIG. 2 is provided between the central tube 4 and the upper end disk 12 and prevents escape of liquid in the direction of the spring element 16. The radial sealing element 18 is embodied as a shaped seal and is comprised of a basic member 27 and a flexibly designed sealing lip 28 adjoining the basic member 27; the sealing lip 28 rests on the central tube 4 once the filter element 2 is pushed onto the central tube 4. The semi-spherical shape of the sealing element 28 reduces the friction between the radial sealing element 18 and the central tube 4 so that upon movement of the first filter element 2 the friction force between radial sealing element 18 and central tube 4 is minimal and the force expenditure for displacement of the first filter element 2 remains minimal.

Figure 1B:
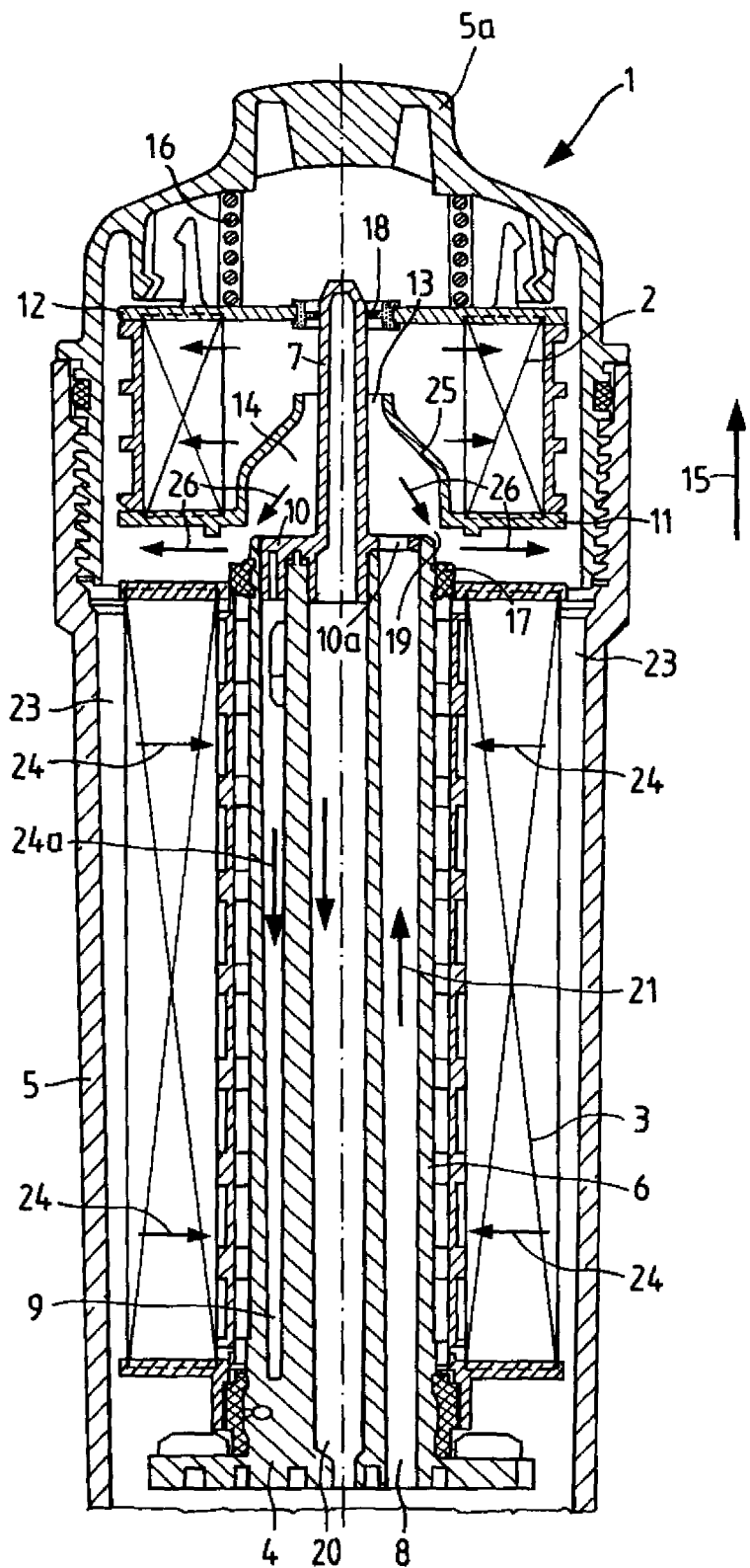
FIG. 1b is a section illustration of the filter arrangement according to the present invention in an extended position of the first filter element.

With the aid of FIGS. 1a and 1b the function of the filter arrangement is described in the following.

When, as illustrated in FIG. 1a, the first filter element 2 is in the basic position, liquid flows along the inlet line 8 (arrow 21) into the chamber 14 and passes through the gap 13 into the first filter element 2. The liquid moves then from the raw side to the clean side of the filter medium of the first filter element 2, i.e., substantially in radial direction outwardly (along the arrows 22). Once the liquid has passed the first filter element 2, it is guided through a cavity 23, formed between the housing 5 and the filter elements 2, 3, to the downstream second filter element 3 where the liquid is subjected to a second filtering action. The liquid flows from the raw side to the clean side of the second filter element in radial direction inwardly (compare arrows 24). At the clean side of the second filter element 3, the filtered fluid flows through the discharge line 9 in downward direction (compare arrows 24a) out of the filter arrangement 1.

As described above, contaminants in the liquid to be filtered can lead to clogging and thus blockage of the first filter element 2. When considering that in this case liquid continues to flow through the inlet line 8 into the filter arrangement 1, a pressure increase in front of the first filter element 2 will occur. The increased pressure exists also in the chamber 14 because liquid continues to flow through the inlet line 8 into the chamber 14 but no liquid or only an insufficient quantity of liquid can flow through the gap 13 out of the chamber 14.

As a result of the increased pressure an increased force results that is acting on the (rigid) wall section 25 of the lower end disk 11 that is curved toward the upper end disk 12. The force that is acting for an existing pressure in axial direction (upward direction) depends on the geometry of the wall section 25, more precisely on its surface in a projection perpendicular to the movement direction. In order to utilize this upwardly oriented force for transferring the first filter element 2 from the basic position into an extended position, illustrated in FIG. 1b, this force must be greater than the weight force of the first filter element 2 acting in downward direction and the restoring force that is exerted by the spring element 16 onto the first filter element 2.

When this is the case, i.e., by means of the increased pressure in the chamber 14 the upwardly oriented force is greater than the weight force of the first filter element 2 and the restoring force of the spring element 16, the first filter element 2 moves along the central tube 4 from the basic position (see FIG. 1a) into the extended position (see FIG. 1b) in upward direction (arrow 15).

As a result of this movement a bypass 19 between the bottom side of the lower end disk 11 and the shoulder 10 of the central tube 4 or the axial seal 17 is provided. When the first filter element 2 is clogged, the liquid that has been retained will flow out through the bypass 19 and the increased pressure at the raw side of the first filter element 2 (in comparison to its clean side) decreases. The liquid therefore bypasses through bypass 19 the first filter element 2 and flows directly along arrows 26 from the inlet line 8 to the radial outwardly positioned raw side of the second filter element 3. By means of the bypass 19 damage of the first filter element 2 by increased pressure can thus be avoided. The liquid passes along its further course along the arrows 24 through the filter medium of the second filter element 3 and subsequently flows through discharge line 9 out of the filter arrangement 1 so that even for a clogged first filter element 2 the liquid can still be filtered by means of the second filter element 3.

The first filter element 2 is in general a prefilter that is designed to filter out coarse particles; the second filter element 3 is a main filter that removes smaller particles from the liquid. It is understood that optionally the second filter element can be eliminated. In this case, the first filter element in the basic position can be seated on a suitable counter member, for example, a stepped central tube that, relative to the central tube 4 of FIGS. 1a, 1b, in the extension direction has a significantly smaller wide section in which the inlet for the liquid is formed.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A filter arrangement for filtering liquids, the filter arrangement comprising:
a filter housing;
an elongated central tube arranged in said housing;
a first filter element disposed onto said central tube within said housing,
wherein said central tube extends into an open interior of said first filter element,
wherein said first filter element is flowed through in radial direction outwardly
wherein said first filter element is moveable along and slideable along said central tube so as to be movable from a basic position on said central tube into a different extended position on said central tube;
a second filter element disposed on said central tube with said housing, said central tube extending through an open interior of said second filter element and extending through opposing end caps of said second filter element, wherein said second filter element is arranged downstream of said first filter element, wherein said second filter element is flowed through in radial direction inwardly;

an inlet line supplying a liquid to be filtered to an interior of said first filter element;

a spring element applying a force acting on said first filter element;

wherein when said first filter element is in said basic position, said liquid is confined to flow from said inlet line through said first filter element to a clean side of said first filter element, wherein when said first filter element moves along said central tube to said extended position, said movement to said extended position opens a liquid bypass defined by and extending between said central tube and said first filter element, said bypass enabling liquid to flow from said inlet line and through said bypass to said clean side of said first filter element, wherein said spring element applies a restoring force in a direction of extension of said central tube, and wherein said spring element is arranged on a side of said first filter element that is facing away from said second filter element.

2. The filter arrangement according to claim 1, wherein said first filter element is transferable from said basic position into said extended position by a pressure increase at a raw side of said first filter element.

3. The filter arrangement according to claim 2, wherein said central tube has a stepped configuration comprising a wide section and a narrow section connected by a shoulder, said wide section being of a larger diameter than said narrow section.

4. The filter arrangement according to claim 3, wherein when said first filter element is in said basic position along said central tube, a fluid chamber is formed between a first end disk of said first filter element and said central tube, said inlet line supply liquid to said chamber, said chamber opening to a raw side of said first filter element, said chamber for pressure build-up at said raw side.

5. The filter arrangement according to claim 4, wherein said first end disk of said first filter element includes a radial inwardly positioned wall section that is curved away and extends away from said wide section of said central tube into said interior of said first filter element.

6. The filter arrangement according to claim 1, wherein said first filter element is moveable against said restoring force of said spring from said basic position into said extended position.

7. The filter arrangement according to claim 1, wherein said liquid bypass in said basic position is sealed by an axial sealing element.

8. The filter arrangement according to claim 7, wherein said axial sealing element is embodied as a shaped seal.

9. The filter arrangement according to claim 1, further comprising a radial sealing element provided between said central tube and an end disk of said first filter element.

10. The filter arrangement according to claim 9, wherein said end disk is arranged on said side of said first filter element facing away from said second filter element.

11. The filter arrangement according to claim 9, wherein said radial sealing element has a flexible sealing lip for a low-friction sealing action between said end disk and said central tube.

12. The filter arrangement according to claim 1, wherein said inlet line is disposed in said central tube.

* * * * *